United States Patent [19]

Shimizu et al.

[11] Patent Number: 5,729,107
[45] Date of Patent: Mar. 17, 1998

[54] CONTROL DEVICE FOR AN ELECTRIC ACTUATOR OF A STEERING SYSTEM

[75] Inventors: Yasuo Shimizu; Yoshito Nakamura, both of Wako, Japan

[73] Assignee: Honda Giken Kogyo Kabushiki Kaisha, Tokyo, Japan

[21] Appl. No.: 704,968

[22] Filed: Aug. 28, 1996

[30] Foreign Application Priority Data

Aug. 29, 1995 [JP] Japan ................. 7-245408

[51] Int. Cl.$^6$ ............... B62D 6/00; B62D 5/04
[52] U.S. Cl. ............... 318/489; 318/432; 180/412; 180/446
[58] Field of Search ............... 318/632, 648, 318/432, 434, 488, 489; 180/6.2, 6.44, 6.48, 6.5, 412, 443, 446; 364/424.051

[56] References Cited

U.S. PATENT DOCUMENTS

| | | |
|---|---|---|
| 4,669,569 | 6/1987 | Suzuki et al. |
| 4,936,406 | 6/1990 | Tezuka et al. |
| 4,939,653 | 7/1990 | Tsurumiya et al. ............ 364/424.05 |
| 4,940,103 | 7/1990 | Momiyama ............ 180/132 |
| 4,964,481 | 10/1990 | Sano et al. ............ 180/140 |
| 5,089,967 | 2/1992 | Haseda et al. ............ 364/426.02 |
| 5,261,503 | 11/1993 | Yasui ............ 180/142 |

FOREIGN PATENT DOCUMENTS 64-74168   3/1989   Japan .

*Primary Examiner*—Bentsu Ro
*Attorney, Agent, or Firm*—Skjerven Morrill MacPherson Franklin & Friel; Thomas S. MacDonald

[57] ABSTRACT

In a control device for an electric actuator of a steering system of a vehicle, the amount of power assist provided by the electric actuator of the steering system is appropriately diminished when the steering wheel is turned more than appropriate under the given road condition so that the effort to turn the steering wheel may not be excessively reduced even on a slippery road surface. Thus, when the vehicle is steered more than appropriate for a given road condition, the steering effort is increased by reducing the power assist of the steering system, whereby the vehicle operator is prevented from excessively steering the vehicle. This increase in the steering effort occurs only when the vehicle operator attempts to increase the steering angle, and does not affect the tendency of the steering wheel to return to its neutral position.

6 Claims, 16 Drawing Sheets

5,729,107

CONTROL DEVICE FOR AN ELECTRIC ACTUATOR OF A STEERING SYSTEM

TECHNICAL FIELD

The present invention relates to a control device for an electric actuator of a steering system, and in particular to a control device for an electric actuator of a steering system which controls the magnitude of power assist provided by the actuator.

BACKGROUND OF THE INVENTION

In an electric power steering system, an electric motor is provided in association with the steering system for converting a steering input applied to a steering wheel to a steering angle of road wheels so that the steering effort made by the vehicle operator may be assisted by the power output of the electric motor. FIG. 1 illustrates a typical electric power steering system. A steering wheel 1 is attached to an upper end of a steering shaft 2, and a lower end of the steering shaft 2 is connected to a pinion 4 via a connecting shaft 3 which is provided with universal joints 3a and 3b at two ends thereof. The pinion 4 meshes with a rack 8 which extends laterally of the vehicle body and is guided to move along a longitudinal axial line thereof. The two ends of the rack 8 are connected to knuckle arms 7 of right and left front wheels 6 via tie rods 5. This manual steering system is generally denoted with numeral 9 in FIG. 1. To provide a power assist to this steering system, an electric motor 10 is coaxially combined with the rack 8 for axially actuating the rack 8. A steering torque sensor 11 and a steering angle sensor 12 are provided in appropriate parts of the steering system to detect the magnitude of the steering effort applied to the steering wheel 1 by the vehicle operator, and the steering angle of the steering wheel 1, respectively. The electric motor 10 is controlled by a controller 13 which receives output signals Tp and θ from these sensors 11 and 12.

As illustrated in FIG. 2, the controller 13 comprises target output torque defining means 14 for defining a target torque that should be produced from the electric motor 10, and electric motor driving means 15 for controlling the electric motor 10 according to the target output torque. The electric motor 10 thus produces an assisting output torque for assisting the steering effort applied to the steering wheel 1 by the vehicle operator.

In a steering system, the required steering effort depends on the reaction which the road wheels receive from the road surface, and can become significantly small when the frictional coefficient of the road surface is small, for instance, because of snow accumulation on the road surface. However, the power steering system continues to assist the steering effort even in such a situation, and the unnecessary power assist for the steering system tends to cause an undesirable impression to the vehicle operator. It was previously proposed in Japanese patent laid-open publication No. 64-74168 to deliberately apply a resistance to the rotation of the steering wheel under prescribed conditions so as to control the tendency of the vehicle operator to excessively steer the vehicle on a slippery road. However, the resistance to the rotation of the steering wheel also resists the rotation of the steering wheel as it returns to its neutral position, and this could cause a substantial discomfort to the vehicle operator as he is used to the tendency of the steering wheel to return to its neutral position by itself.

BRIEF SUMMARY OF THE INVENTION

In view of such problems of the prior art, a primary object of the present invention is to provide a control device for an electric actuator of a steering system which can apply a suitable amount of reaction to the steering system so that the steering effort which the vehicle operator is required to apply to the steering wheel is suitably controlled under all conditions of the road surface.

A second object of the present invention is to provide a control device for an electric actuator of a steering system which can apply a suitable mount of resistance to a steering effort when the vehicle is steered more than appropriate, but allows the steering wheel to return to its neutral position without any substantial resistance.

According to the present invention, these and other objects can be accomplished by providing a control device for an electric actuator of a steering system of a vehicle, comprising: steering torque detecting means for detecting a steering input torque applied to an input end of a steering system; steering angle detecting means for detecting a steering angle of a road wheel; means for estimating a frictional coefficient of a road surface on which the vehicle is traveling; maximum steering angle defining means for defining a maximum permissible steering angle according to a frictional coefficient estimated by the fictional coefficient estimating means; and target torque computing means for determining a target output torque of the electric actuator according to outputs from the steering torque detecting means, the steering angle detecting means, and the maximum steering angle defining means; whereby the target output torque of the electric actuator is reduced from a normal value according to a magnitude of the detected steering angle in relation with the maximum permissible steering angle. In particular, the target output torque of the electric actuator may be at least sharply reduced from a normal value when the detected steering angle is greater than the maximum permissible steering angle.

Thus, when the vehicle is steered more than appropriate for a given road condition, the steering effort is increased by reducing the power assist of the steering system, whereby the vehicle operator is prevented from excessively steering the vehicle. This increase in the steering effort occurs only when the vehicle operator attempts to increase the steering angle, and does not affect the tendency of the steering wheel to return to its neutral position.

This can be accomplished by obtaining a nominal target output torque according to the steering input torque detected by the steering torque detecting means, obtaining a compensation coefficient or a compensation cons/ant according to a difference between the maximum permissible steering angle and the detected steering angle, and multiplying the compensation coefficient to or subtracting the compensation constant from the nominal target output torque.

For the determination of the maximum permissible steering angle, it is essential to detect the current frictional coefficient of the road surface. For instance, it can be estimated from a fore-and-aft deceleration of the vehicle when an brake anti-lock system has been actuated during a braking action. Alternatively, the frictional coefficient may be estimated from a yaw response or a lateral acceleration response of the vehicle under given operating conditions of the vehicle.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 3:
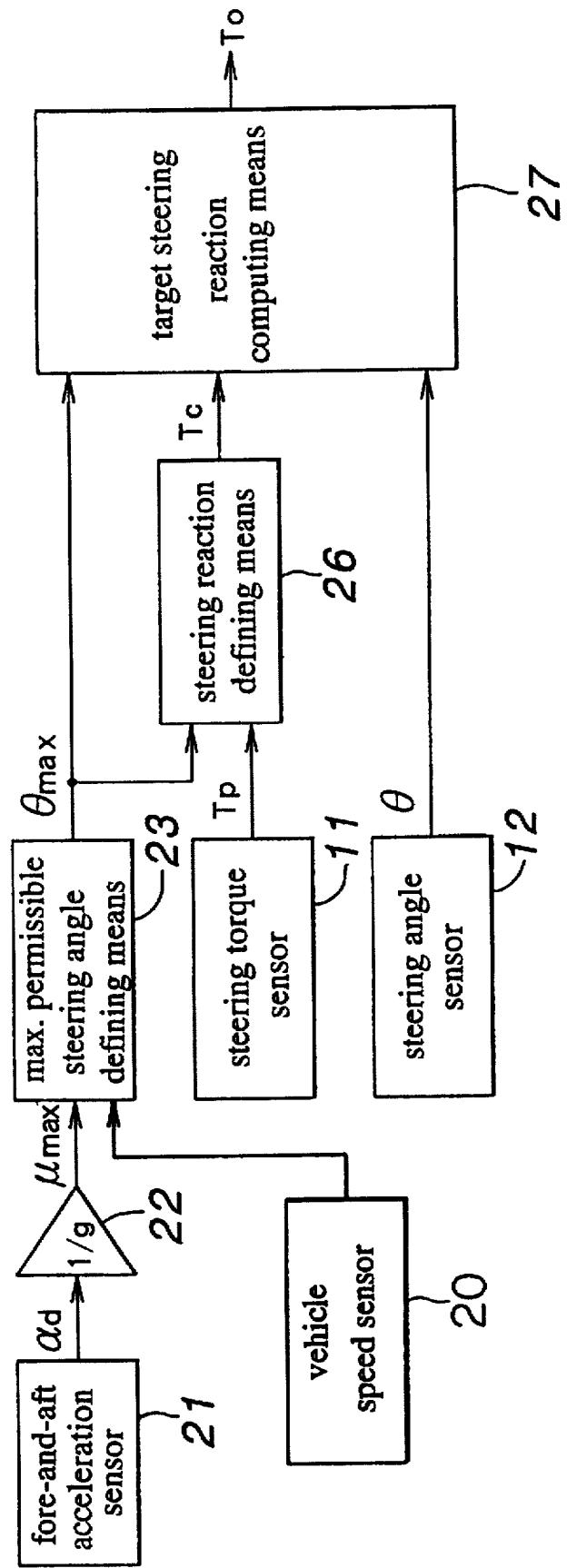
FIG. 3 is a block diagram showing the basic embodiment of the present invention.
Figure 2:
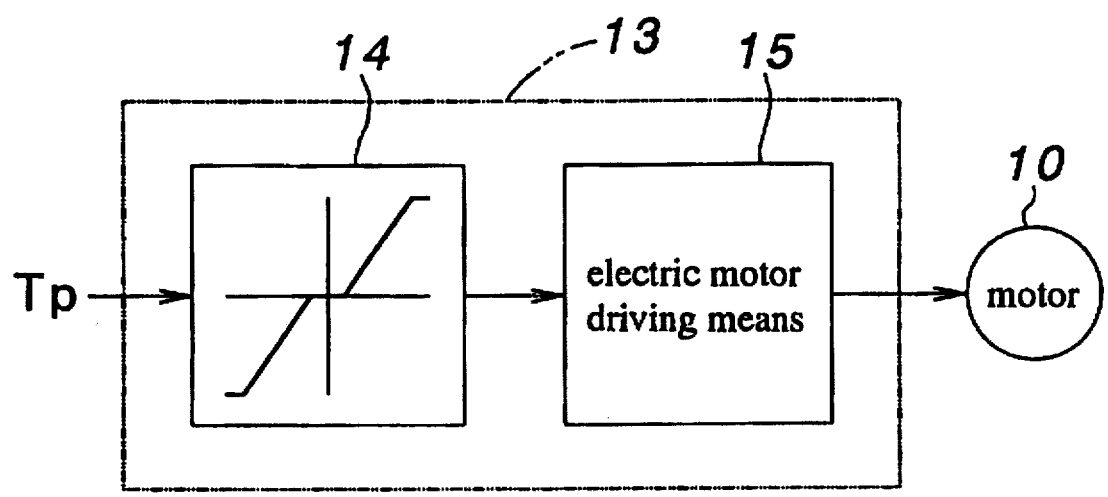
FIG. 2 is a block diagram illustrating the basic principle of the operation of the electric power steering system.
Figure 3:
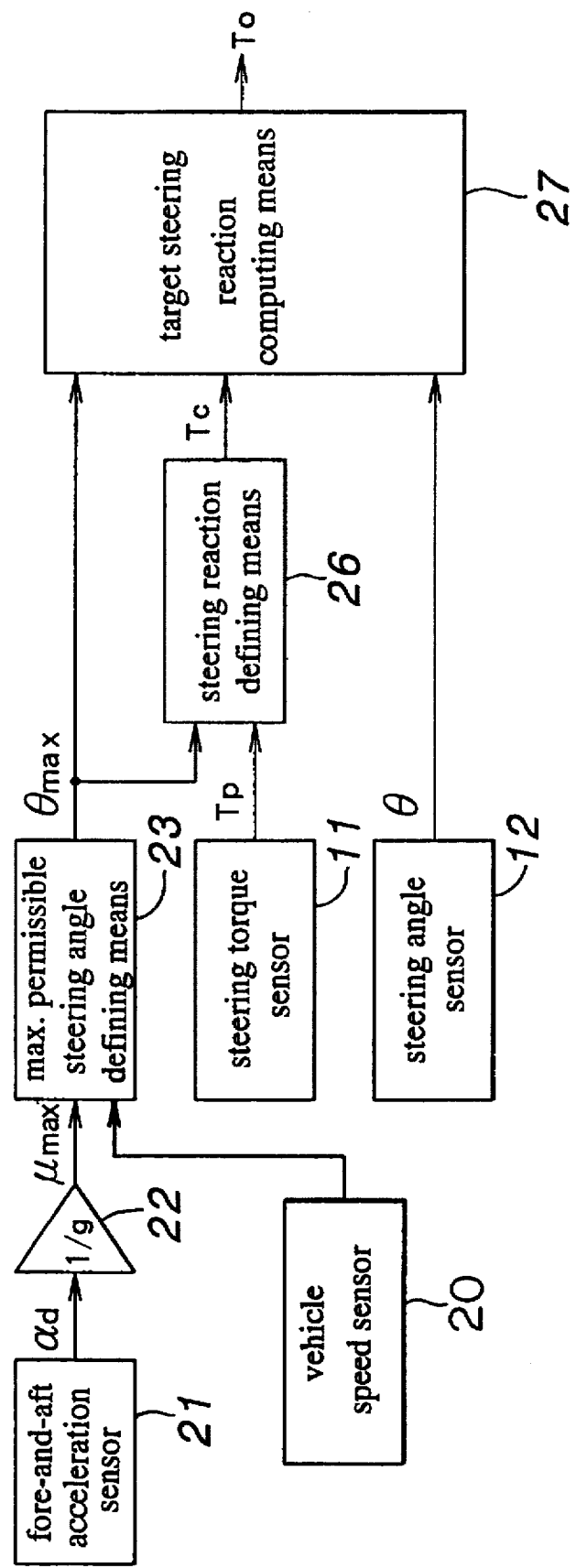

When a brake is applied to a wheel and the brake anti-lock system is activated, the fore-and-aft deceleration of the vehicle body $\alpha_d$ takes a maximum possible value under the given road condition. When it happens, the following relationship holds between the maximum fore-and-aft deceleration of the vehicle body $\alpha_d$ and the maximum frictional coefficient of the road surface $\mu_{max}$.

$$\alpha_{dmax} = \mu_{max} \cdot g \quad (1)$$

where g is a gravitational acceleration. Therefore, as illustrated in FIG. 3 which conceptually illustrates a system for computing a target steering assist torque that should be produced from the electric motor 10 according to the present invention, it is possible to estimate the maximum frictional coefficient $\mu_{max}$ of the road surface by multiplying, with a multiplier 22, an inverse of the gravitational acceleration (1/g) to the output of a fore-and-aft acceleration sensor 21 provided in a suitable part of the vehicle body. This provides a highly economical means for estimating the maximum frictional coefficient $\mu_{max}$. The estimated maximum frictional coefficient $\mu_{max}$ is supplied to maximum permissible steering angle defining means 23, along with the traveling speed of the vehicle obtained by a vehicle speed sensor 20.

Figure 4:
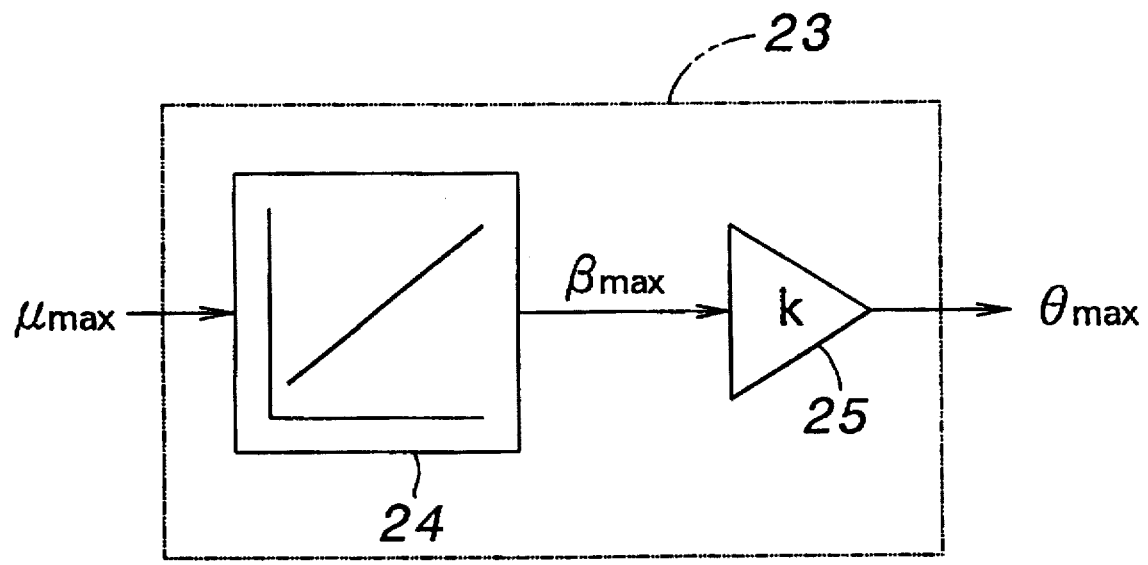
FIG. 4 is a block diagram showing an example of the maximum steering angle defining means.
Figure 15:
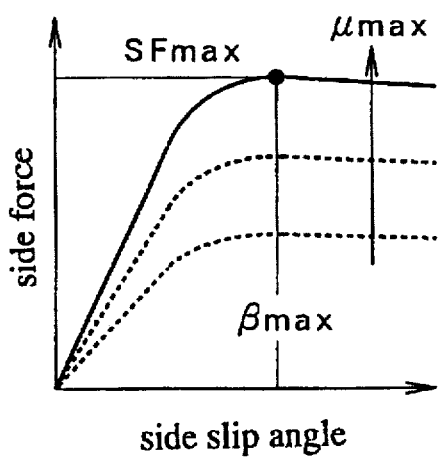
FIG. 15 is a graph showing the relationship between the side force and the side slip angle of a road wheel.
Figure 16:
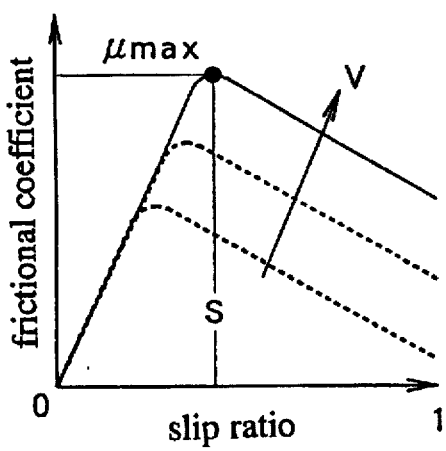
FIG. 16 is a graph showing the relationship between the frictional coefficient of the road surface and the slip ratio.
Figure 17:
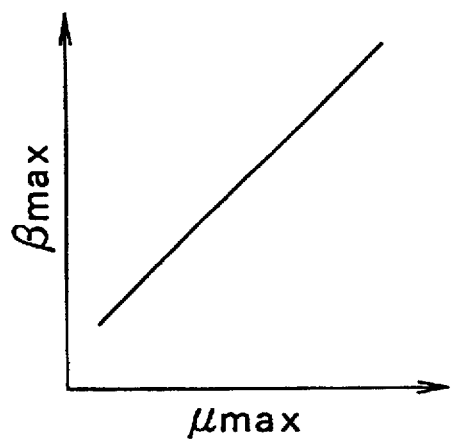
FIG. 17 is a graph showing the relationship between the side slip angle and the frictional coefficient of the road surface.

The maximum lateral force SFmax which the wheel can produce on a certain standard road surface is related to a side slip angle βmax which gives such a maximum lateral force as illustrated in FIG. 15, and the maximum frictional coefficient $\mu_{max}$ of the same road surface for the road wheel during braking or traction is related to the slip ratio S at that time as illustrated in FIG. 16. Therefore, there is a certain correlation between the maximum frictional coefficient $\mu_{max}$ and the corresponding side slip angle βmax which gives rise to a maximum lateral acceleration. Thus, as illustrated in FIG. 4, this critical side slip angle βmax is obtained by supplying the current maximum frictional coefficient $\mu_{max}$ to a lookup table or a map 24, and the maximum permissible steering angle θmax that can be safely taken under the current road condition can be obtained by multiplying, with a multiplier 25, a certain coefficient k to the critical side slip angle βmax corresponding to the maximum lateral acceleration.

A current steering reaction Tc is defined by steering reaction defining means 26 (which is described hereinafter) according to the maximum permissible steering angle θmax and the steering input or the manual steering torque Tp obtained from the steering torque sensor 11, and is then forwarded to target steering reaction computing means 27.

Figure 5:
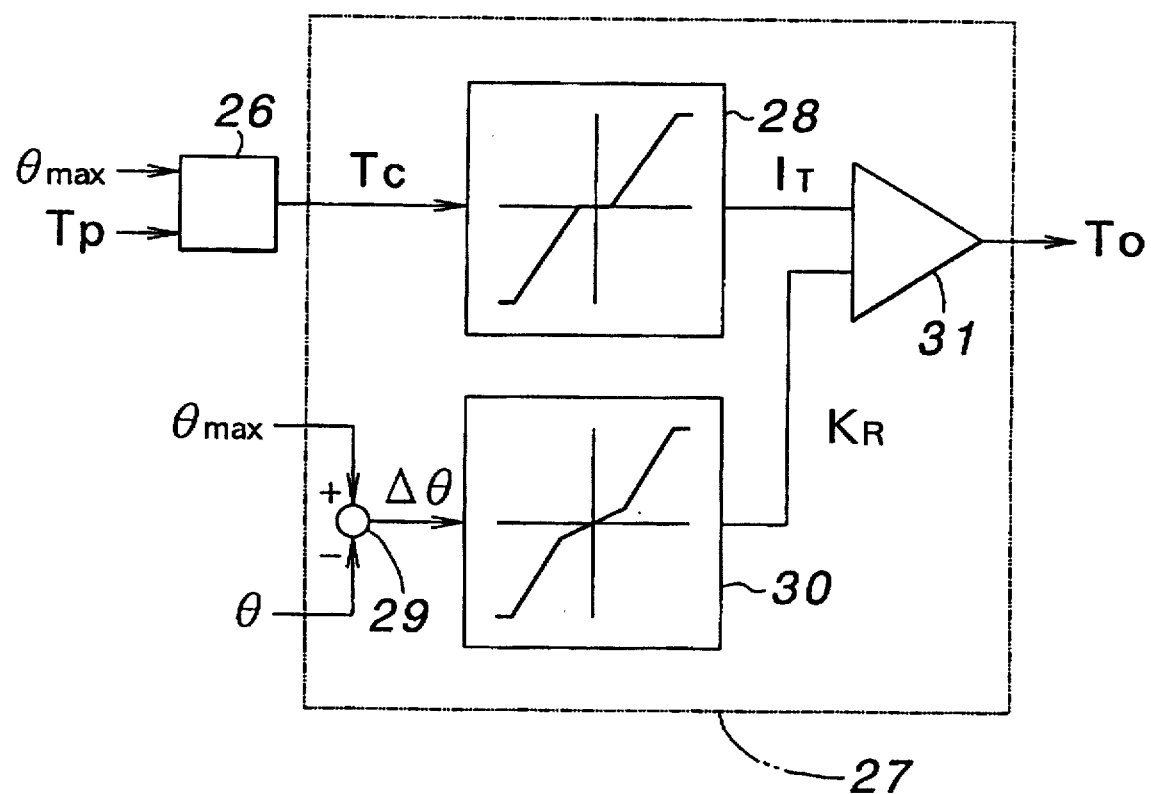
FIG. 5 is a block diagram showing an example of the target steering reaction computing means.

FIG. 5 shows an example of the structure of the target steering reaction computing means 27. The output Tc of the steering reaction defining means 26 is supplied to a drive signal target value map 28 to obtain a drive signal target value $I_T$. At the same time, the output θmax of the maximum permissible steering angle defining means 23 and the output θ of the steering angle sensors 12 are supplied to deviation computing means 29, and the deviation Δθ obtained by the deviation computing means 29 is supplied to a map 30 for determining a compensation coefficient $k_R$ by which the assisting steering torque is to be diminished so that the steering reaction is optimized. The drive signal target value $I_T$ is multiplied the compensation coefficient $k_R$ in a multiplier 31 to obtain an output target value $T_O$.

The output target value $T_O$ is thus obtained according to the steering input $T_P$ obtained from the steering torque sensor 11, the actual steering angle θ obtained from the steering angle sensor 12, and the maximum permissible steering angle θmax defined according to the current maximum fictional coefficient $\mu_{max}$ of the road surface. Therefore, the output of the electric actuator is controlled in an optimum fashion in relation with the frictional coefficient of the road surface, and the actual steering angle according to the steering input $T_P$ obtained from the steering torque sensor and the maximum permissible steering angle. In particular, by obtaining the compensation coefficient $K_R$ from a compensation coefficient map 30 according to the deviation of the actual steering angle from the maximum permissible steering angle, and multiplying the compensation coefficient to the drive signal target value $I_T$, it is possible to optimally control the output of the electric motor according to the deviation Δθ.

Figure 6:
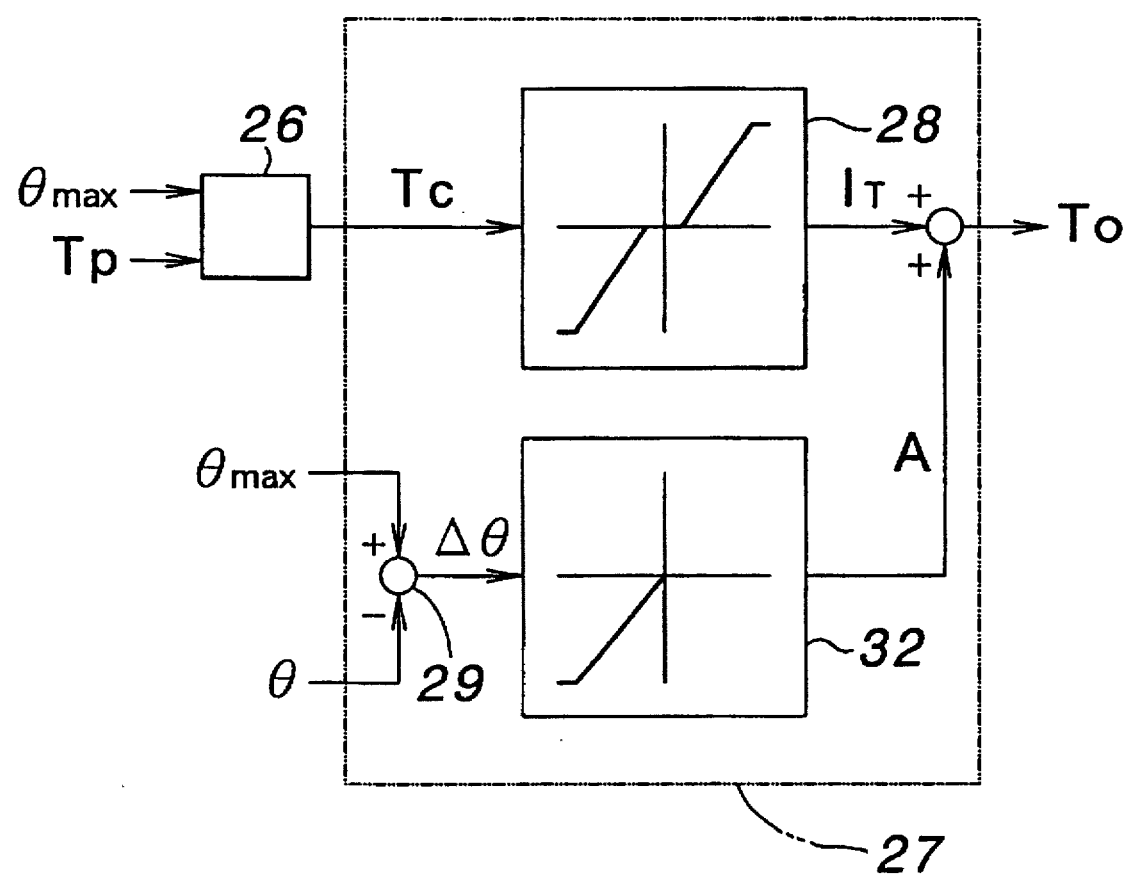
FIG. 6 is a block diagram showing another example of the target steering reaction computing means.

Instead of obtaining the compensation coefficient $K_R$ from the compensation coefficient map 30 according to the deviation of the actual steering angle from the maximum permissible steering angle, and multiplying the compensation coefficient to the drive signal target value $I_T$, it is also possible (FIG. 6) to add a compensation value A, obtained by supplying a deviation of the actual steering angle from the maximum permissible Steering angle to a compensation value defining map 32, to the drive signal target value $I_T$ obtained by supplying the output Tc from the steering reaction defining means 26 to the drive signal target value map 28.

Figure 7:
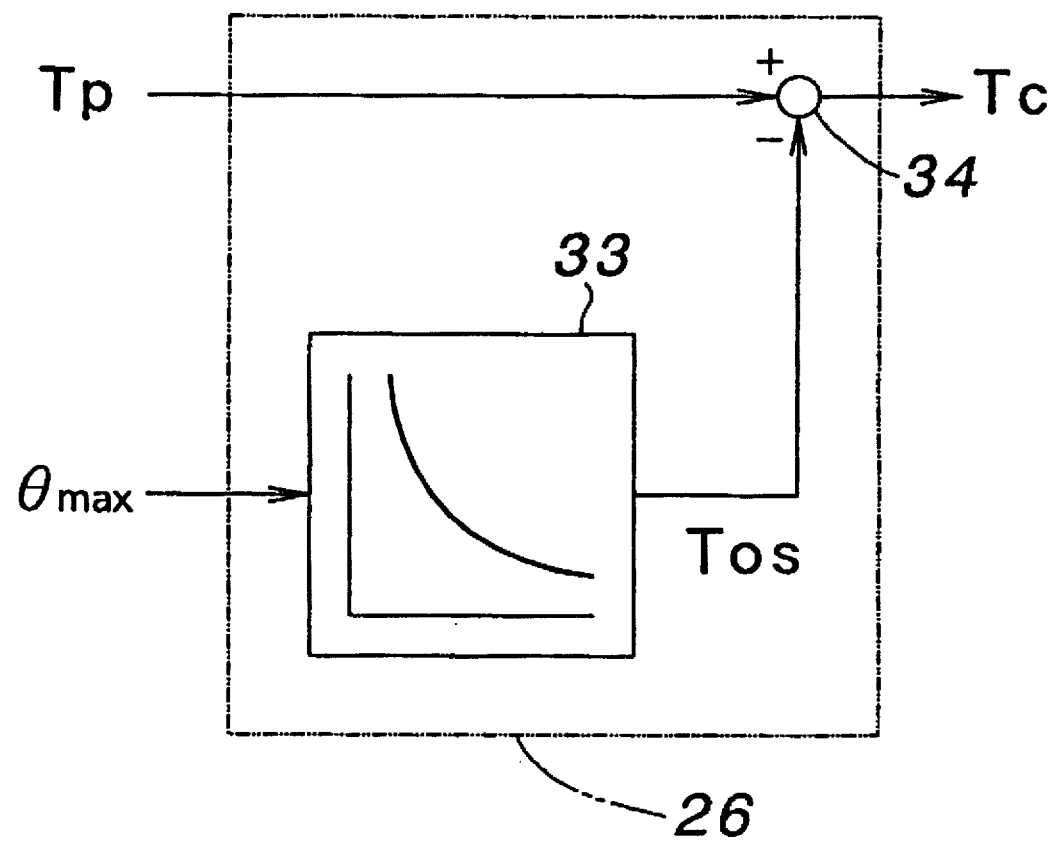
FIG. 7 is a block diagram showing an example of the steering reaction defining means.
Figure 18:
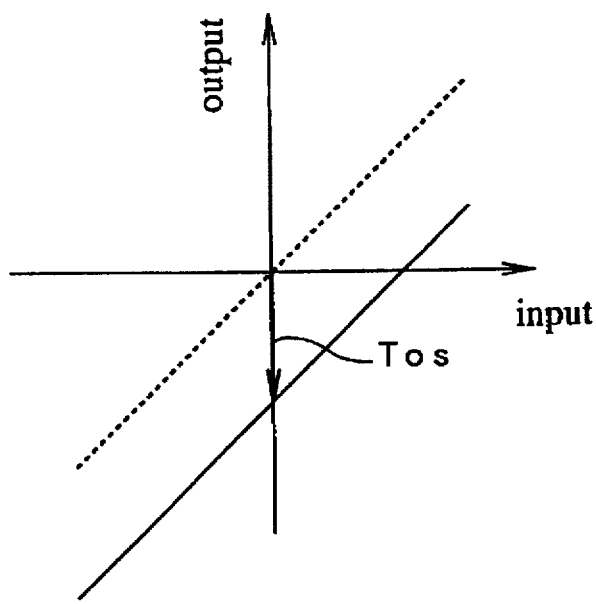
FIG. 18 is a graph for showing the principle for producing a necessary steering reaction even at a neural position.

FIG. 7 illustrates an example of the steering reaction defining means 26. In FIG. 7, the maximum permissible steering angle θmax produced from the maximum permissible steering angle defining means 23 is supplied to an offset defining means 33 to obtain an offset Tos which is appropriate for the required steering reaction. This offset Tos is subtracted from the output Tp of the steering torque sensor 11 in a subtractor 34 to obtain the steering reaction Tc. According to this procedure, it is possible to obtain a required steering reaction Tc even in a neutral region in which control action is not normally applied, as illustrated in FIG. 18. In other words, this arrangement allows a steering reaction against the steering effort to be applied even in a neutral region or a dead band region in which the power assist from the steering system is absent. Similar results can be achieved by slightly adjusting the map 32 of FIG. 6 so that a steering reaction may be provided in such a neutral region.

Figure 8:
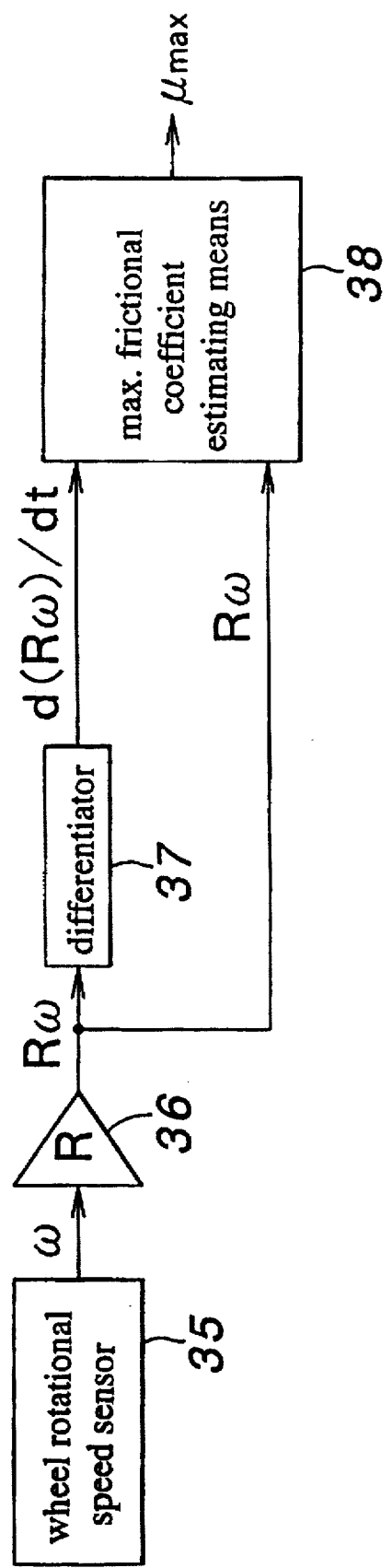
FIG. 8 is a block diagram showing a method for estimating the maximum frictional coefficient of a given road surface.

FIG. 8 shows an alternate method for estimating the maximum frictional coefficient $\mu_{max}$ of the road surface. The output ω from a wheel rotating speed sensor 35 is multiplied to the radius of the wheel R in a multiplier 36 to obtain the circumferential speed of the wheel Rω. This output is differentiated by time into a circumferential acceleration of the wheel d(Rω)/dt in a differentiator 37 on the one hand, and is supplied, along with the circumferential acceleration of the wheel d(Rω)/dt, to the maximum fictional coefficient estimating means 38 on the other hand.

Figure 9:
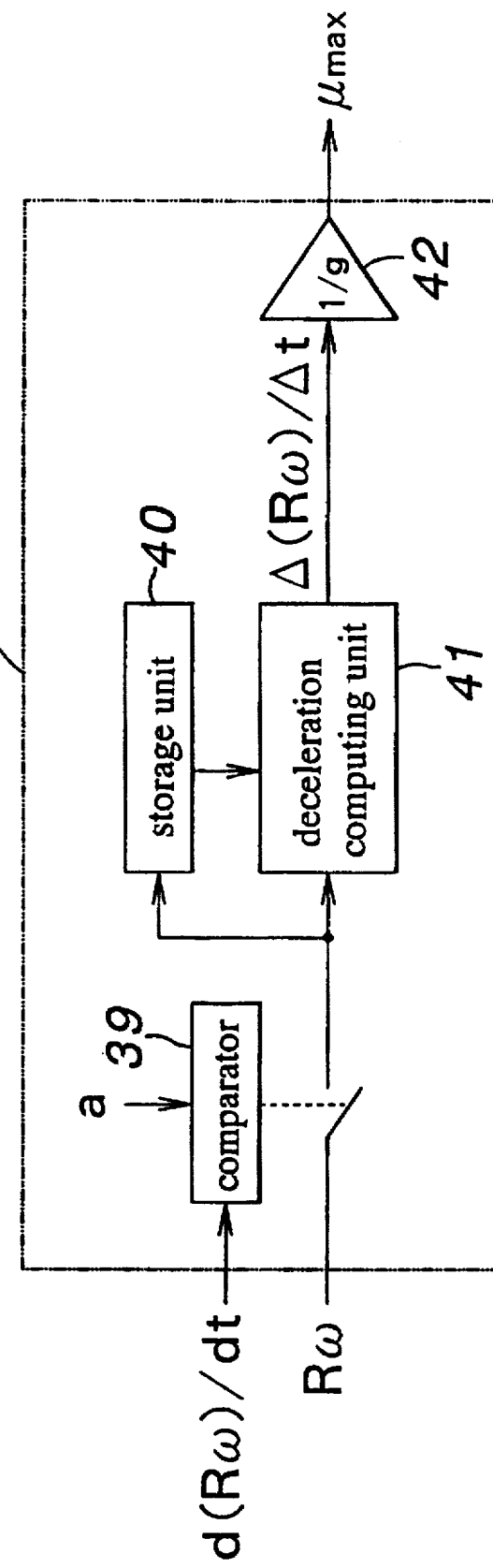
FIG. 9 is a block diagram showing a part of FIG. 8 in more detail.
Figure 19:
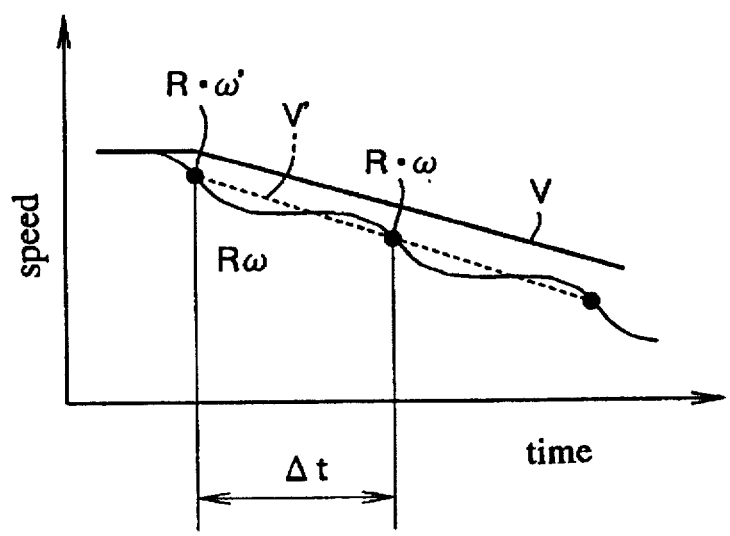
FIG. 19 is an example of the change in the circumferential speed of a road wheel when a brake is applied thereto and a brake anti-lock system has been activated.

When a brake is applied to a wheel without locking the wheel under the action of a brake anti-lock system, the circumferential speed Rω of the wheel changes as indicated in the graph of FIG. 19. The line or curve V' obtained by connecting the points of the curve of the circumferential speed Rω at which the change rate of the circumferential speed Rω or the inclination angle of the curve representing the circumferential speed Rω is equal to a prescribed value can be considered to be in parallel with the line or the curve V representing the speed of the vehicle body. Therefore, by assuming this curve V' to be representing the actual deceleration of the vehicle body, the maximum frictional coefficient of the road surface can be estimated from Equation (1). More specifically, as illustrated in FIG. 9, the time derivative of the circumferential speed of the wheel d(Rω)/dt is compared with a prescribed threshold value a in a comparator 39, and the circumferential speed of the wheel is captured in a storage unit 40 each time the time derivative of the circumferential speed of the wheel falls below the threshold value. At the same time, this value is supplied to a vehicle body deceleration computing unit 41 to compute the change rate Δ(Rω)/Δt of the circumferential speed of the wheel by comparing the current circumferential speed with the previously captured circumferential speed. By multiplying a value corresponding to the inverse of the gravitational acceleration to the change rate Δ(Rω)/Δt of the circumferential speed of the wheel with a multiplier 42, it is possible to estimate the maximum fictional coefficient $\mu_{max}$. This value is then supplied to the maximum permissible steering angle defining means 23 to determine the output target value in a manner similar to that of the previously described embodiment.

The deceleration of the vehicle body can be estimated with a relatively high precision by using two sets of data each obtained from a combination of outputs of a pair of speed sensors associated with a diagonally opposing pair of wheels. More specifically, by comparing two values each obtained by combining the circumferential speeds of the diagonally opposing pair of driven and non-driven wheels such as the front left wheel and the rear right wheel, and selecting the greater of the two values, it is possible to eliminate any undue irregularities in the speed data. According to this method, existing wheel rotational speed sensors can be used, and the desired object can be achieved substantially without any additional cost.

Figure 10:
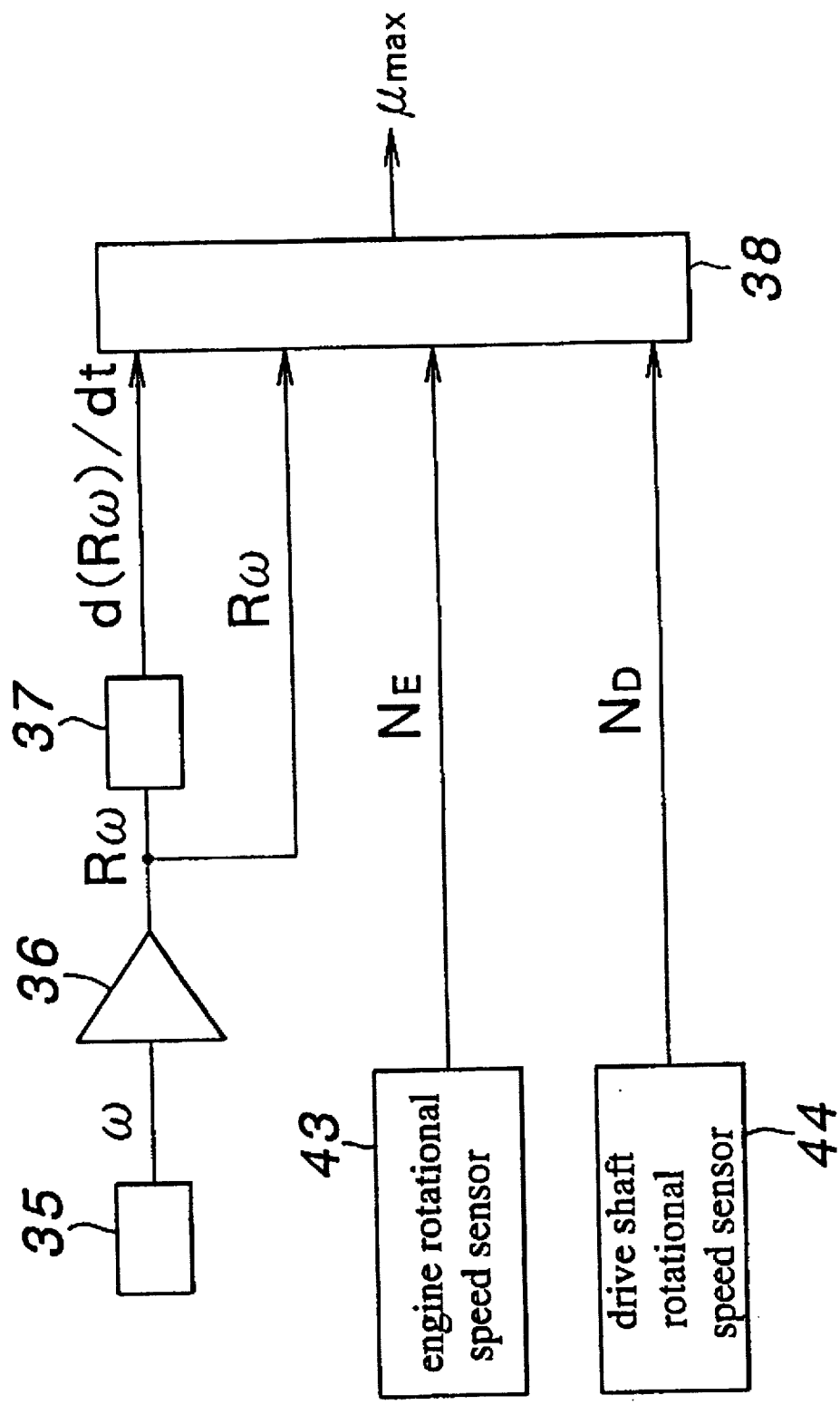
FIG. 10 is a block diagram showing another method for estimating the maximum frictional coefficient of a given road surface.
Figure 11:
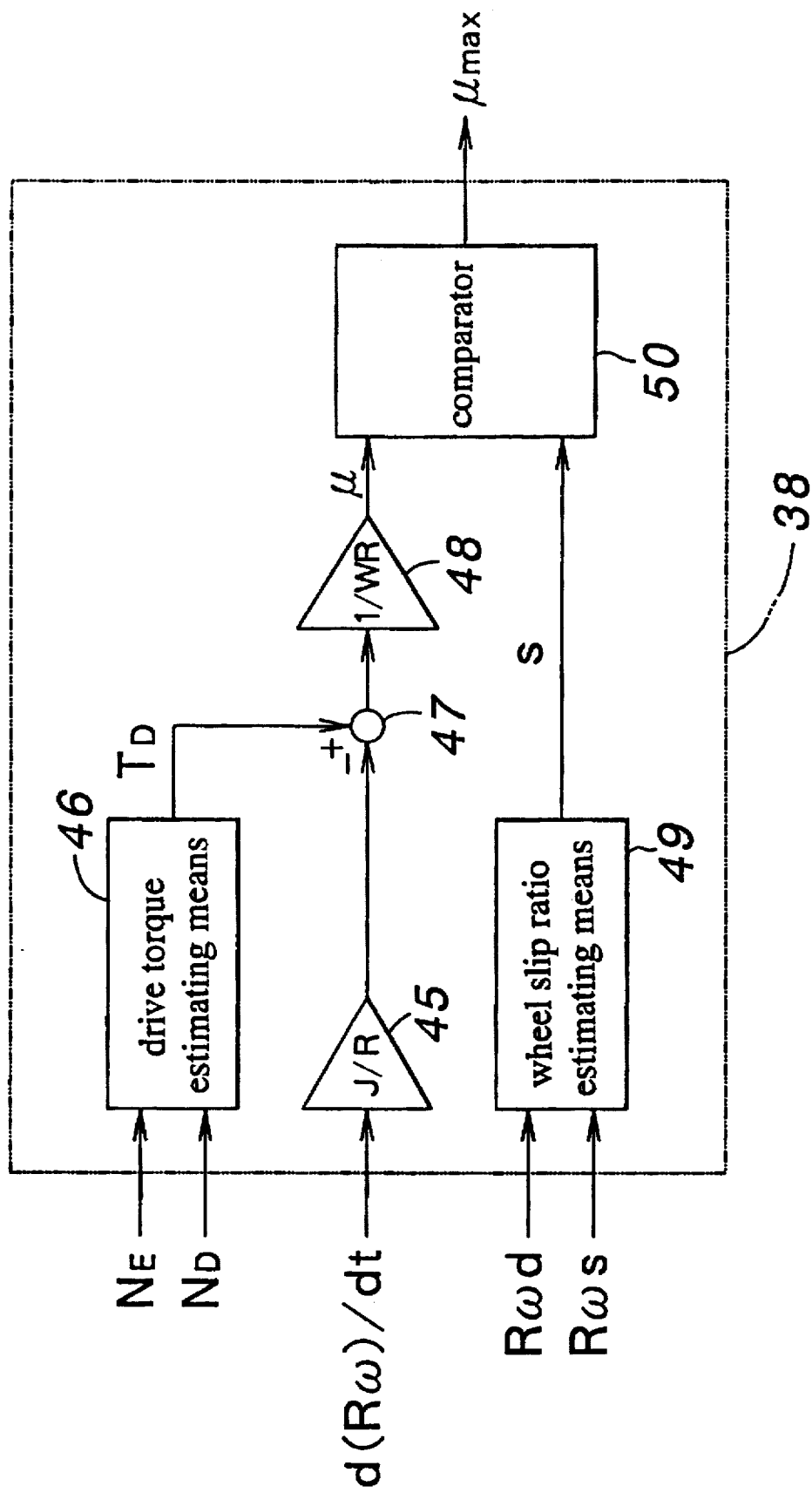
FIG. 11 is a block diagram showing a part of FIG. 10 in more detail.

FIG. 10 illustrates yet another method for estimating the maximum frictional coefficient $\mu_{max}$ of the road surface. In addition to the circumferential speed and acceleration of the wheel or Rω and d(Rω)/dt, the output $N_E$ from a rotational speed sensor 43 of the engine, and the output $N_D$ from the rotational speed sensor of the drive shaft are supplied to the maximum frictional coefficient estimating means 38 to estimate the maximum frictional coefficient $\mu_{max}$. When a traction is applied to the wheel, the following equation of rotative motion holds for the road wheel.

$$J(d\omega/dt) = T_D - \mu \cdot W \cdot R$$

where J is the moment of inertia of the wheel around its center of rotation, W is the vertical load on the road surface, R is the radius of the wheel, and $T_D$ is the tractive torque. FIG. 11 illustrates yet another method for estimating the maximum frictional coefficient $\mu_{max}$ of the road surface based on this principle. The time derivative of the wheel circumferential speed supplied to the maximum frictional coefficient estimating means 38 is multiplied by a coefficient corresponding to J/R in a multiplier 45, and the output of this multiplier is compared with the tractive torque $T_D$ estimated from the engine rotational speed $N_E$ and the drive shaft rotational speed $N_D$ in drive torque estimating means 46, in an arithmetic unit 47. The resulting difference between the two values is multiplied in a multiplier 48 by a coefficient 1/(W·R) to obtain a frictional coefficient μ. At the same time, a circumferential speed of a driven wheel $R\omega_d$ and a circumferential speed of a non-driven wheel $R\omega_s$ are supplied to the maximum fictional coefficient estimating means 38, and forwarded to wheel slip ratio estimating means 49 to compute the wheel slip ratio S according to the following equation. Here, the vehicle body speed V is approximated by the circumferential speed of a non-driven wheel $R\omega_S$.

$$S = (R\omega_S - R\omega_d)/R\omega_d$$

The thus obtained wheel slip ratio S and the frictional coefficient μ are supplied to a comparator 50, and the point of the frictional coefficient μ which gives a local maximum for the wheel slip ratio S is determined as the maximum road surface frictional coefficient $\mu_{max}$ (see FIG. 16).

Figure 12:
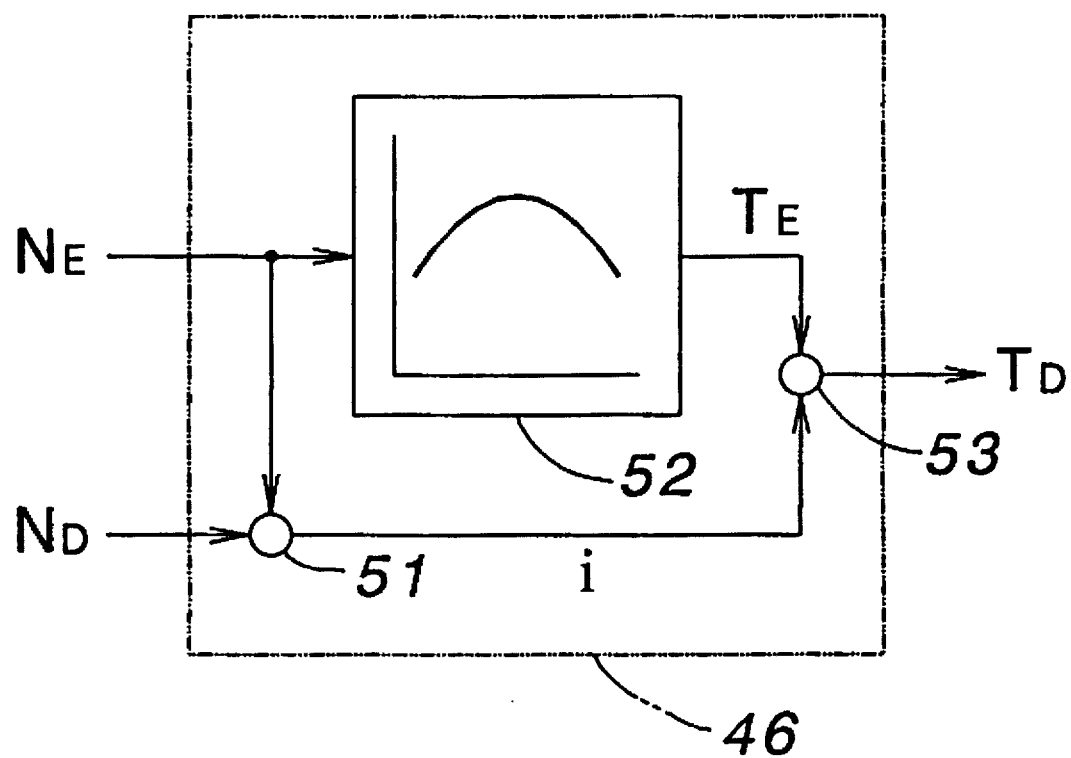
FIG. 12 is a block diagram showing a part of FIG. 11 in more detail.

The tractive torque $T_D$ can be estimated as illustrated in FIG. 12 according to the rotational speed of the engine $N_E$ and the rotational speed of the drive shaft $N_D$. More specifically, the engine rotational speed $N_E$ is supplied to a divider 51 along with the drive shaft rotational speed $N_D$ to compute the reduction ratio between the engine output shaft and the drive shaft according to the equation $i = N_E/N_D$ on the one hand, and to a map 52 based on the torque curve of the engine to obtain the estimated output torque of the engine $T_E$. By multiplying the reduction ratio to the output torque of the engine in a multiplier 53, the tractive torque of the wheel $T_D$ can be obtained.

Figure 13:
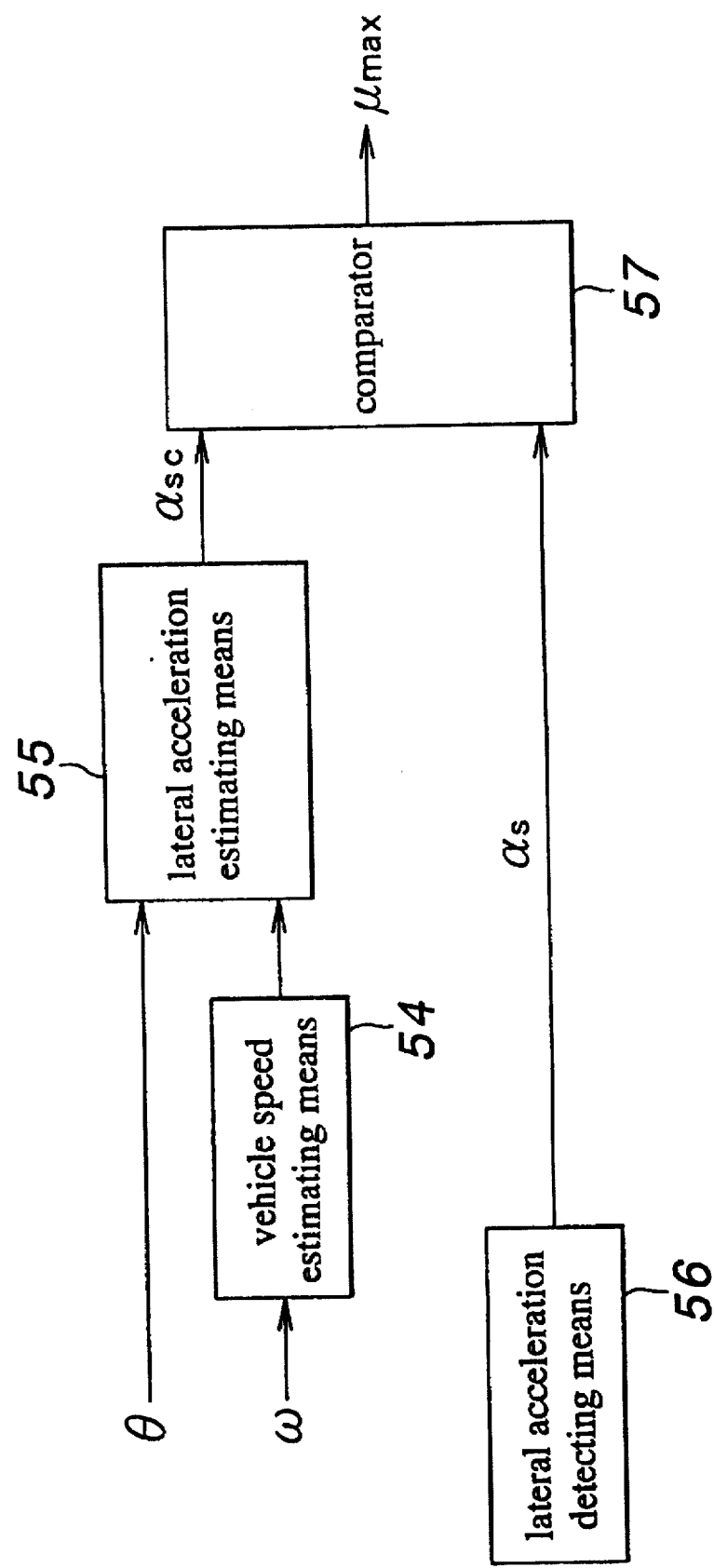
FIG. 13 is a block diagram showing yet another method for estimating the maximum frictional coefficient of a given road surface.

FIG. 13 shows yet another method for estimating the maximum road surface frictional ceefficient $\mu_{max}$. The vehicle body speed V is estimated with vehicle speed estimating means 54 according the rotational speed of the wheels in a similar manner as the previous embodiments, and is then supplied to lateral acceleration estimating means 55 along with the output from the steering angle sensor 12. The lateral acceleration estimating means 55 is based on the mathematical model of the lateral response of the vehicle, and allows the lateral acceleration to be estimated according to the input values of the vehicle speed and the steering input. The estimated lateral acceleration and the actual lateral acceleration obtained from a lateral acceleration sensor 56 are supplied to a comparator 57, and the maximum road surface frictional coefficient $\mu_{max}$ is estimated according to the deviation obtained from the comparator 57.

Various mathematical models of the lateral response of a vehicle have been proposed, and the present invention can be implemented by selecting a suitable one from available mathematical models. For instance, reference may be made to "Jidosha no Undo to Seigyo (Behavior and Control of Motor Vehicles)" by Masato Abe, published in 1994 by Sankaido, Tokyo, for equations for describing the lateral response of a vehicle.

Figure 14:
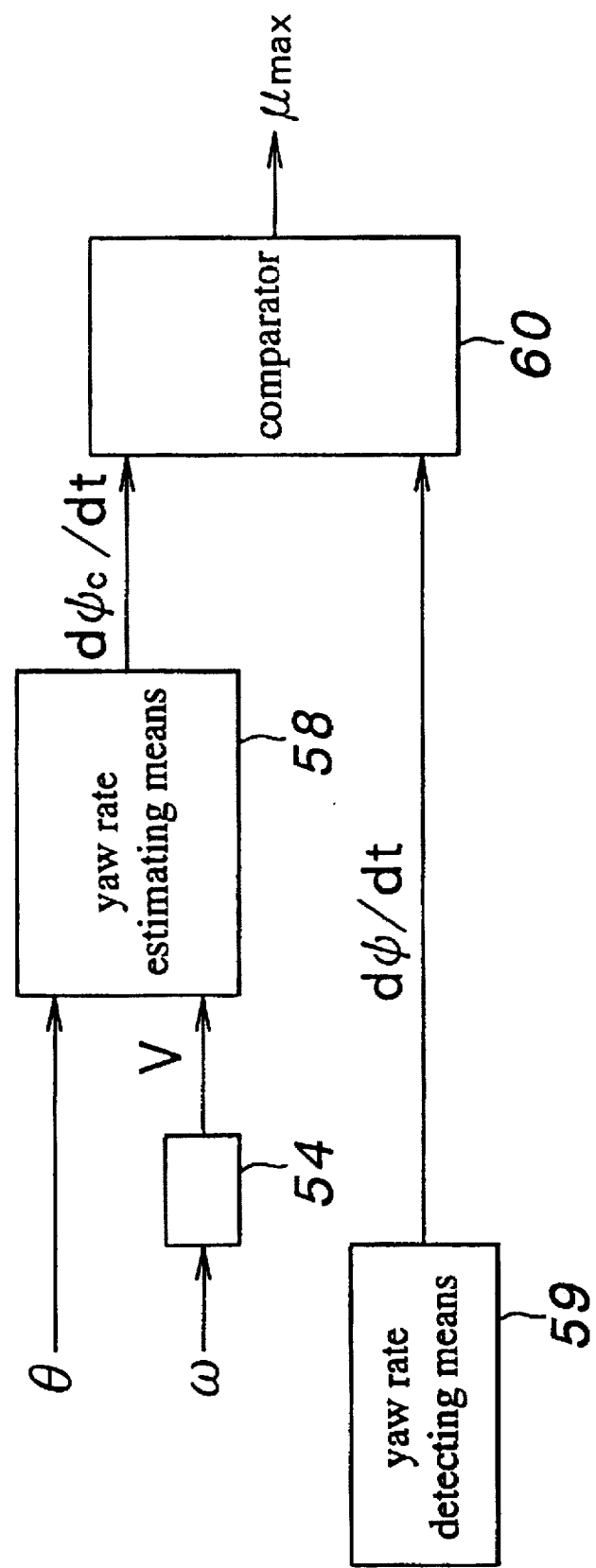
FIG. 14 is a block diagram showing yet another method for estimating the maximum fictional coefficient of a given road surface.

FIG. 14 shows yet another method for estimating the maximum road surface frictional coefficient $\mu_{max}$. The vehicle body speed V and the steering angle θ are supplied to yaw rate estimating means 58 which is based on a mathematical model of the yaw response of the vehicle, and allows the yaw rate of the vehicle to be estimated according to the input values of V and θ. The estimated yaw rate $d\omega_e/dt$ and the actual yaw rate $d\omega/dt$ obtained from a yaw rate sensor 59 are compared in a comparator 60, and the maximum fictional coefficient is estimated according to the deviation obtained by the comparator 60.

Although the present invention has been described in terms of specific embodiment thereof, it is possible to modify and alter details thereof without departing from the spirit of the present invention.

What we claim is:

1. A control device for an electric actuator of a steering system of a vehicle, comprising:

steering torque detecting means for detecting a steering input torque applied to an input end of a steering system;

steering angle detecting means for detecting a steering angle of a road wheel;

means for estimating a frictional coefficient of a road surface on which said vehicle is traveling;

maximum steering angle defining means for defining a maximum permissible steering angle according to a frictional coefficient estimated by said frictional coefficient estimating means; and target torque computing means for determining a target output torque of said electric actuator according to outputs from said steering torque detecting means, said steering angle detecting means, and said maximum steering angle defining means;

whereby said target output torque of said electric actuator is reduced from a normal value according to a magnitude of the detected steering angle in relation with said maximum permissible steering angle.

2. A control device for an electric actuator of a steering system according to claim 1, wherein said target output torque of said electric actuator is at least sharply reduced from a normal value when said detected steering angle is greater than said maximum permissible steering angle.

3. A control device for an electric actuator of a steering system according to claim 1, wherein said target torque computing means comprises means for determining a nominal target output torque according to said steering input torque detected by said steering torque detecting means, deviation computing means for finding a difference between said maximum permissible steering angle and said detected steering angle, means for computing a compensation coefficient according to an output from said deviation computing means, and multiplication means for multiplying said compensation coefficient to said nominal target output torque to obtain said target output torque of said electric actuator.

4. A control device for an electric actuator of a steering system according to claim 1, wherein said target torque computing means comprises means for determining a nominal target output torque according to said steering input torque detected by said steering torque detecting means, deviation computing means for finding a difference between said maximum permissible steering angle and said detected steering angle, means for computing a compensation constant according to an output from said deviation computing means, and subtraction means for subtracting said compensation constant from said nominal target output torque to obtain said target output torque of said electric actuator.

5. A control device for an electric actuator of a steering system according to claim 1, wherein said fictional coefficient is estimated from a fore-and-aft deceleration of said vehicle when an brake anti-lock system has been actuated during a braking action.

6. A control device for an electric actuator of a steering system according to claim 1, wherein said frictional coefficient is estimated from a yaw response or a lateral acceleration response of said vehicle under given operating conditions of said vehicle.

\* \* \* \* \*

UNITED STATES PATENT AND TRADEMARK OFFICE
CERTIFICATE OF CORRECTION

Figure 1:
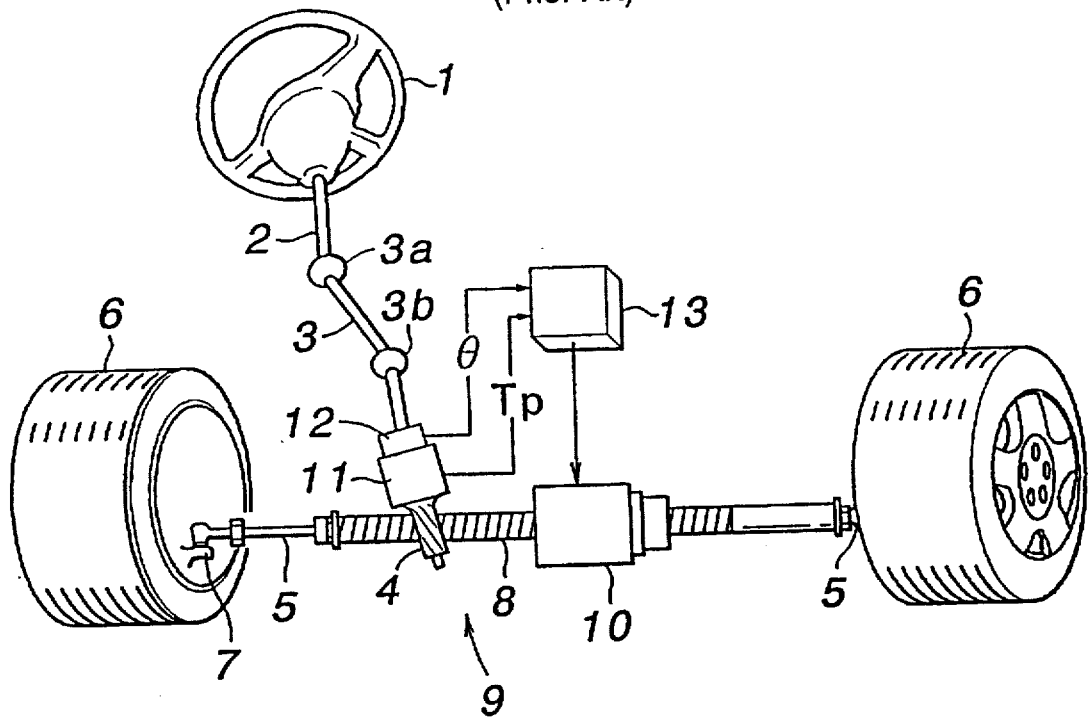
FIG. 1 is a schematic diagram of an electric power steering system to which the present invention is applied.

PATENT NO. : 5,729,107
DATED : March 17, 1998
INVENTOR(S) : Yasuo Shimizu, Yoshito Nakamura It is certified that error appears in the above-identified patent and that said Letters Patent is hereby corrected as shown below:

Delete sheet 1/16 having Fig. 3 thereon and insert the proper sheet 1/16 attached having Fig. 1 thereon.

Signed and Sealed this

Ninth Day of February, 1999

Attest:

*Attesting Officer*

*Acting Commissioner of Patents and Trademarks*